United States Patent [19]

Takida

[11] Patent Number: 4,746,700

[45] Date of Patent: May 24, 1988

[54] PROCESS FOR PREPARING VINYL ALCOHOL COPOLYMER

[75] Inventor: Hiroshi Takida, Takatsuki, Japan

[73] Assignee: Nippon Fohsei Kagaku Kogyo Kabushiki Kaisha, Osaka, Japan

[21] Appl. No.: 832,880

[22] Filed: Feb. 26, 1986

[30] Foreign Application Priority Data

Feb. 26, 1985 [JP] Japan ................................ 60-38079

[51] Int. Cl.$^4$ ................................................ C08F 8/00
[52] U.S. Cl. ........................................ 525/59; 525/60; 526/82; 526/84
[58] Field of Search ................................ 525/59, 60

[56] References Cited

FOREIGN PATENT DOCUMENTS 0070291 6/1976 Japan ........................................ 525/59
1237175 6/1971 United Kingdom ................ 525/59

Primary Examiner—Joseph L. Schofer
Assistant Examiner—J. M. Reddick
Attorney, Agent, or Firm—Antonelli, Terry & Wands

[57] ABSTRACT

A process for preparing a vinyl alcohol copolymer, which comprises adding at least one specific olefin derivative containing phenyl group to a solution of vinyl ester copolymer when the predetermined polymerization conversion has been attained, removing an unpolymerized monomer and hydrolyzing the copolymer. The hydrolyzed copolymer easily gives transparent film which has not fish eyes or surface roughness without generation of fumes or bad odors and coloration during molding.

8 Claims, No Drawings

PROCESS FOR PREPARING VINYL ALCOHOL COPOLYMER

BACKGROUND OF THE INVENTION

The present invention relates to a process for preparing vinyl alcohol copolymers which can give moldings having improved qualities, and more particularly to a process for preparing an ethylene-vinyl alcohol copolymer or an α-olefin-vinyl alcohol copolymer.

Various uses are expected from vinyl alcohol copolymers because of having various properties which are not found in a vinyl alcohol homopolymer due to kinds and amounts of monomers copolymerized with vinyl alcohol. Particularly, an ethylene-vinyl alcohol copolymer and an α-olefin-vinyl alcohol copolymer have excellent oxygen impermeability, oil resistance, antistatic property, mechanical strength, and the like, and are useful as wrapping or packaging materials in any shape such as sheet, film or container.

Recently, however, the requirement of high qualities is increasing with technical revolution and, for instance, presence of slight fish eyes or surface roughness on moldings of ethylene-vinyl alcohol copolymer becomes a problem and also a higher transparency is required.

That is, as the most general process for preparing ethylene-vinyl alcohol copolymer, there is a process in which ethylene and vinyl acetate are copolymerized by solution polymerization, then, removing unpolymerized vinyl acetate from the polymerization mixture, and hydrolysis reaction of the ethylene-vinyl acetate copolymer is carried out in the presence of an alkali catalyst. According to the above-mentioned process, when an amount of alkali catalyst is increased, reaction temperature is raised or reaction time is prolonged in order to obtain high hydrolysed copolymer, the obtained hydrolysed copolymer has defects that coloration, fish eyes, surface roughness remarkably occur on the melt moldings of the hydrolysed copolymer. Accordingly, it is attempted that the hydrolysed copolymer is sufficiently washed in comparison with a conventional technique, but the sufficient washing does not yet provide a satisfactory result in improving the above-mentioned defects.

The present inventor thought that the abovementioned defects would result from a polymerization inhibitor added to the solution of ethylene-vinyl acetate copolymer after copolymerization reaction and made an experiment on various polymerization inhibitors such as m-dinitrobenzene, hydroquinone, hydroquinone monomethyl ether, hydroquinone dimethyl ether, t-butyl catechol, nonyl phenol, o-benzoquinone, p-benzoquinone, thiodiphenylamine, sulfur, styrene, butadiene, naphthalene and anthracene. However, the present inventor could not find a polymerization inhibitor having effect of preventing the formation of fish eyes, coloration, and fumes or bad odors through molding in addition to the effect of inhibiting the polymerization. For instance, in case of employing m-dinitrobenzene as a polymerization inhibitor, when an amount of an alkali catalyst is increased in order to raise a degree of hydrolysis, the coloration becomes remarkable. On the other hand, when an amount of an alkali catalyst is decreased, even the coloration is decreased but the effect of inhibiting the polymerization is lacked and fish eyes in films of hydrolyzed copolymer increase.

An object of the present invention is to provide a process for preparing a vinyl alcohol copolymer which can give easily a molding having excellent qualities.

A further object of the present invention is to provide a process for preparing an ethylene-vinyl alcohol copolymer and an α-olefin-vinyl alcohol copolymer which can give moldings having excellent qualities.

These and other objects of the present invention will become apparent from the description hereinafter.

SUMMARY OF THE INVENTION

In accordance with the present invention, there is provided a process for preparing vinyl alcohol copolymers, which comprises adding at least one olefin derivative containing phenyl group selected from the group consisting of the derivatives of the following formulas (I), (II) and (III) to a solution of a vinyl ester copolymer when the predetermined polymerization conversion has been attained, removing an unpolymerized monomer and hydrolysing the copolymer

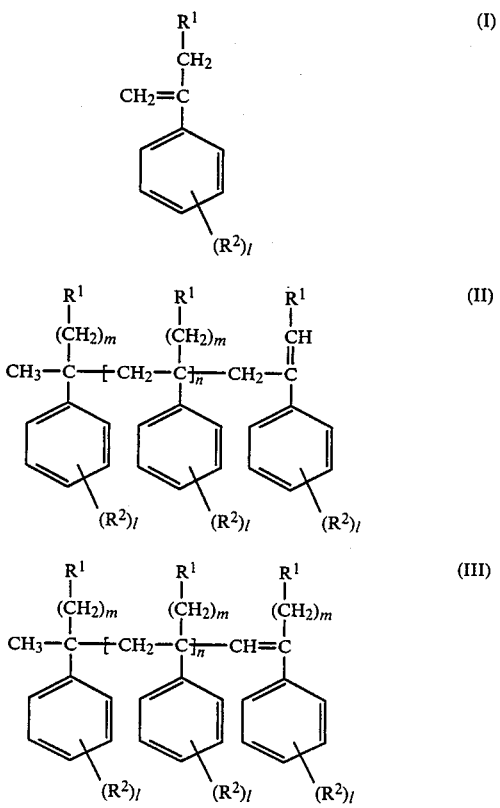

wherein $R^1$ is hydrogen atom or an alkyl group; $R^2$ is hydrogen atom, an alkyl group, an alkoxyl group, amino group, nitro group, carboxyl group, or an ester group; m is 0 or 1; n is 0 or an integer of 1 to 3; and l is 0 or an integer of 1 to 5.

DETAILED DESCRIPTION

In the present invention, at least one olefin derivative selected from the group consisting of the derivative (I), the derivative (II) and the derivative (III) is added to the solution of ethylene-vinyl acetate copolymer when the predetermined polymerization conversion has been attained.

The solution copolymerization of ethylene and vinyl acetate can be carried out by any of continuous and batch polymerization. The suitable copolymerization condition is determined due to a kind of copolymerization method. For instance, in case of the batch copolymerization, the copolymerization is carried out under the following condition.

Solvent: Alcohol or a mixed solvent including alcohol as a main component

Weight ratio of catalyst to vinyl-acetate: from 0.1 to 0.55

Ethylene pressure: from 10 to 60 kg/cm², preferably from 25 to 55 kg/cm²

Catalyst: Azo compound such as 2,2'-azobisisobutyronitrile or 2,2'-azobis-(2,4-dimethylvaleronitrile); organic peroxide such as acetylperoxide, benzoylperoxide, lauroyl peroxide, diisopropyl peroxydicarbonate or bis-(4-t-butylcyclohexyl) peroxydicarbonate Chain transfer agent: It is used as occasion demands Polymerization temperature: from 40° to 80° C., preferably from 55° to 65° C.

Polymerization time: from 4 to 10 hours

Polymerization conversion (vinyl ester): from 20 to 90%, preferably from 40 to 70%

Resin content in the polymerization mixture: from 15 to 75% by weight, preferably from 40 to 60% by weight Ethylene content in the obtained copolymer: from 10 to 55% by mole, preferably from 20 to 50% by mole Other monomers copolymerizable with ethylene and vinyl acetate may be further added in a small amount. Examples of the other monomers are, for instance, an olefin such as propylene, isobutylene, α-octene or α-dodecene: an unsaturated acid such as acrylic acid, methacrylic acid, crotonic acid, maleic acid, or itaconic acid and an anhydride, salt and mono or dialkyl ester thereof; a nitrile such as acrylonitrile or methacrylonitrile; an amide such as acrylamide, or methacrylamide; an olefin sulfonic acid such as ethylene sulfonic acid or allyl sulfonic acid, and a salt thereof; an alkyl vinyl ether, vinyl ketone, N-vinylpyrrolidone, vinyl chloride, vinylidene chloride, and the like.

At least one of the above-mentioned olefin derivatives (I), (II) and (III) is added to the solution of ethylene-vinyl acetate copolymer as the polymerization inhibitor when the predetermined polymerization conversion has been attained. The predetermined polymerization conversion of vinyl acetate is generally from 20 to 90%. An amount of the olefin derivative added is from 5 to 1,000 ppm based on the charged vinyl acetate monomer upon polymerizing, preferably from 20 to 200 ppm. When the amount of the olefin derivative is less than 5 ppm, a homopolymer of vinyl acetate is formed, because the effect of inhibiting the polymerization is unsatisfactory. Accordingly, polyvinyl alcohol exists in the obtained hydrolysed copolymer in a small amount and it results in formation of fish eyes in the films molded. On the other hand, the used of more than 1,000 ppm is uneconomical because the effect is scarcely increased.

In the invention, as the olefin derivative containing phenyl group, which is employed as the polymerization inhibitor, compounds having the following formulas (I), (II) and (III) can be used.

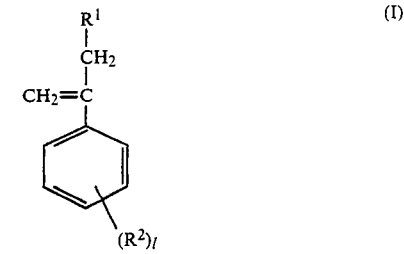

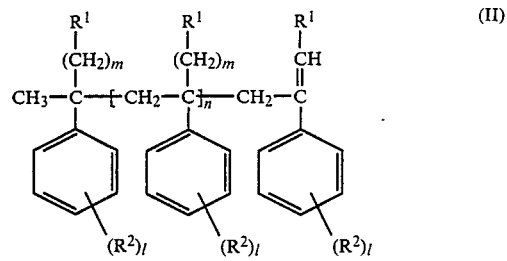

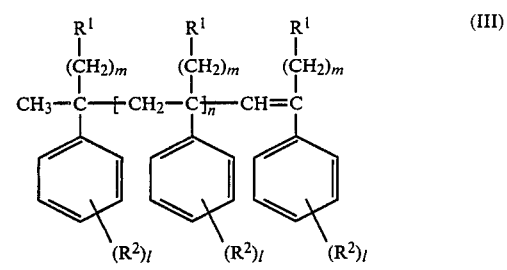

wherein $R^1$ is hydrogen atom or an alkyl group having 1 to 3 carbon atoms; $R^2$ is hydrogen atom, an alkyl group having 1 to 5 carbon atoms, an alkoxyl group having 1 to 5 carbon atoms, amino group, nitro group, carboxyl group or an alkyl ester such as methyl ester or ethyl ester; m is 0 or 1; n is 0 or an integer of 1 to 3 and l is 0 or an integer of 1 to 5. Any compounds having the above-mentioned formulas (I), (II) and (III) can be employed, but the effect of the olefin derivatives is influenced due to the number of carbon atoms of main chain in the derivative. When the number of carbon atoms is more than 10, the solubility of the olefin derivatives to the polymerization solvent such as alcohol and vinyl ester decreases and a large amount of solvent is required upon adding the olefin derivative to the polymerization solution. This is unbeneficial to industrial process because the concentration step is required before hydrolysing the copolymer.

Examples of the olefin derivatives (I) are, for instance, 2-phenyl-1-propene, 2-phenyl-1-butene, and the like. Examples of the olefin derivative (II) are, for instance, 2,4-diphenyl-4-methyl-1-pentene, 3,5-diphenyl-5-methyl-2-heptene, 2,4,6-triphenyl-4,6-dimethyl-1-heptene, 3,5,7-triphenyl-5-ethyl-7-methyl-2-nonene, and the like. Examples of the olefin derivative (III) are, for instance, 1,3-diphenyl-1-butene, 2,4-diphenyl-4-methyl-2-pentene, 3,5-diphenyl-5-methyl-3-heptene, 1,3,5-triphenyl-1-hexene, 2,4,6-triphenyl-4,6-dimethyl-2-heptene, 3,5,7-triphenyl-5-ethyl-7-methyl-3-nonene, and the like. These olefin derivatives are not limited to only such examples.

The residual vinyl acetate monomer is removed from the solution of ethylene-vinyl acetate copolymer to which the olefin derivative is added. As a removing method of the residual vinyl acetate monomer, for instance, there is a method in which a solution of ethylene-vinyl acetate copolymer is fed into an upper portion of a reaction tower such as a tower filled with Raschig rings or setted with tray, vapor of solvent such as methanol is blown into a lower portion of the reaction tower to contact countercurrently ethylene-vinyl acetate copolymer solution with the vapor of the solvent, the solvent and vinyl acetate monomer are taken out from the upper portion of the tower, and the solution of ethylene-vinyl acetate copolymer in which vinyl acetate monomer does not remain is taken out from the lower portion of the tower.

The hydrolysis reaction of ethylene-vinyl acetate copolymer is carried out in the presence of the alkali catalyst. Any of batch and continuous methods are applicable to the hydrolysis reaction of ethylene-vinyl acetate copolymer. As the alkali catalyst, sodium hydroxide, pottasium hydroxide, an alcoholate of alkali metal, and the like are employed. The batchwise hydrolysis reaction of the ethylene-vinyl acetate copolymer is, for instance, carried out under the following conditions.

Resin concentration of the charged solution of the copolymer: 30 to 60% by weight
Hydrolysis reaction temperature: from 30° to 60° C.
Amount of the catalyst: from 50 to 300 millimoles based on the vinyl acetylate group
Hydrolysis reaction time: from 1 to 3 hours The hydrolysed copolymer has a degree of hydrolysis of not less than 95% by mole, preferably a degree of hydrolysis of not less than 98% by mole, more preferably a degree of hydrolysis of not less than 99% by mole. When the desired degree of hydrolysis is not attained in one step, the partly hydrolysed copolymer may be subjected to the secondary hydrolysis reaction, that is, the partly hydrolysed copolymer is dissolved or dispersed in an aqueous solution of alkali, which is heated with stirring.

The hydrolyzed ethylene-vinyl acetate copolymer includes impurites such as an alkali catalyst, byproduced salts and accordingly, the washing step is essential.

In the invention, the acid treatment is carried out after, before or during washing the hydrolysed copolymer. The term "acid treatment" as used in herein means a treatment in which the hydrolyzed ethylene-vinyl acetate copolymer is contacted with an aqueous solution of acid or organic solvent of acid at a slurry state. Examples of the acid are, for instance, phosphoric acid, pyrophosphoric acid, phosphorous acid, sulfuric acid, hydrochloric acid, acetic acid, citric acid, tartaric acid, oxalic acid, partial salts thereof assuming acidity, and the like. In the acid treatment, it is preferable that slurry concentration is selected from the range of about 50 to about 10% by weight and a concentration of acid group is from 0.5 to 5 moles per mole of a sodium ion in the hydrolysed copolymer.

After completing the acid treatment, the hydrolysed copolymer is further washed as occassion demands and is dried.

The obtained hydrolysed ethylene vinyl acetate copolymer is widely used as moldings, adhesives, paints, and the like. Particularly, when the hydrolysed copolymer obtained in the process of the invention is employed as molding materials, the effect of the improvement can be extremely exhibited. That is, the hydrolysed ehtylene-vinyl acetate copolymer is processed into various molded articles such as a pellet, a sheet, a container, a fiber, a bar and a pipe by melt kneading. Also, the pulverized articles (in case of reusing of used articles) or pelets may be further subjected to the melt molding. The obtained film or sheet can be uniaxially or biaxially stretched. As a molding method, an extrusion such as T die extrusion, tubular film process, blow molding, melt spinning or profile extrusion and an injection molding are mainly applicable to molding the obtained hydrolysed copolymer. It is preferable that the melt kneading temperature is from 170° to 270° C. The above-mentioned injection molding includes two-color molding and injection blow molding, and the obtained molded articles have high dimensional precision. Also, there can be molded the mixture of two or more kinds of the hydrolysed ethylene-vinyl acetate copolymers different from each other in an ethylene content or a degree of hydrolysis.

When the hydrolysed copolymer is subjected to melt-molding, usual additives can be admixed in a proper amount to the hydrolysed copolymer. Examples of the additive are, for instance, plasticizers such as polyhydric alcohol, stabilizers, surfactants, cross linkable substances such as epoxy compounds, polyvalent metal salts or organic or inorganic polybasic acids or salts thereof, fillers, coloring agents, fibers employed as reinforcement (glass fibers, carbon fibers, and the like), and the like. Also, other thermoplastic resins may be admixed in a proper amount to the hydrolysed copolymer. Examples of the other thermoplastic resin are, for instance, polyolefins such as polyethylene, polypropylene, ethylene-propylene copolymer, ethylene-propylene-butadiene coplymer, a copolymer of ethylene and an α-olefin having not less than 4 carbon atoms, ethylene-vinyl acetate copolymer, ethylene-acrylic acid ester copolymer, an ionomer, polybutene or polypentene; a modified polyolefin prepared by graft-polymerization of unsaturated carboxylic acid or derivative thereof with the above-mentioned polyolefin; polyamide such as nylon 6 nylon 66 copolymer, polyvinyl chloride, polyvinylidene chloride, polyester, polystyrene, polyacrylonitrile, polyurethane, polyacetal, polyvinyl alcohol resin capable of melt-molding, and the like.

When the extrusion is adopted as the melt kneading method, not only the extrusion in which the hydrolysed ethylene-vinyl acetate copolymer is employed alone can be carried out, but also there can be carried out the coextrusion in which the hydrolysed copolymer and other thermoplastic resins are melt kneaded separately and they are extruded so as to join at the inside of a die or a combining adaptor or the outside of the die. Also, the hydrolysed ethylene-vinyl acetate copolymer composition can be extrusion-laminated on a base material film such as plastic film, metal foil or paper. As the other thermoplastic resin used in the coextrusion, the abovementioned thermoplastic resins can be employed. Examples of the plastic film used as the base material in the extrusion lamination are, for instance, cellophane, polypropylene film, polyamide film, polyester film (they may be uniaxially or biaxially stretched, or polyvinylidene chloride, and the like may be coated on both sides or one side thereof), a laminated film thereof, and the like. The thus obtained films and containers are useful as wrapping or packaging materials for foods, medical supplies, industrial chemical reagents, agricultural chemicals, and the like.

The process of the invention is applicable to not only the ethylene-vinyl alcohol copolymer but also other copolymers including vinyl alcohol units as a main component. As the other copolymers, there is exemplified, for instance, a coplymer of a vinyl ester, such as vinyl acetate, vinyl propionate or vinyl butyrate and monomer copolymerizable with the above-mentioned vinyl ester. Examples of the copolymerizable monomers are, for instance, olefins such as propylene, isobutylene, α-octene, α-dodecene or α-octadecene; unsaturated acids such as acrylic acid, methacrylic acid crotonic acid, maleic acid, maleic anhydride or itaconic acid, salts or mono or dialkyl esters thereof; nitriles such as acrylonitrile or methacrylonitrile; and amides such as acrylamide or methacrylamide; olefinsulfonic acids such as ethylene-sulfonic acid, allylsulfonic acid or methallylsulfonic acid, or salts thereof; alkyl vinyl ethers, vinyl ketones, N-vinylpyrrolidone, vinyl chloride, vinylidene chloride, and the like. The above-mentioned copolymers and monomers are not limited thereto.

According to the present invention, as mentioned above, the vinyl alcohol copolymer having excellent qualities can be obtained by using the special olefin derivatives containing phenyl group selected from the group consisting of the derivatives of the formulas (I), (II) and (III) as the polymerization inhibitor when ethylene-vinyl acetate copolymer is prepared. There can be obtained tranparent films which have not fish eyes or surface roughness without generation of fumes or bad odors and coloration during molding.

The present invention is more specifically described and explained by means of the following Examples and Comparative Examples in which all parts and percentages are by weight unless otherwise noted. It is to be understood that the present invention is not limited to the Examples, and various changes and modifications may be made in the invention without departing from the spirit and scope thereof.

EXAMPLE 1

A polymerization vessel was charged with 100 parts of vinyl acetate, 12 parts of methanol and 0.02 part of 2,2'-azobisisobutyronitrile. After the space in the vessel was displaced with nitrogen gas and then with ethylene, ethylene was introduced to the vessel with pressure till a pressure became 35 Kg/cm$^2$. Then, the mixture was heated up to 60° C. with stirring and the copolymerization reaction was continued for 7 hours.

When the polymerization conversion of vinyl acetate was attained to 44%, methanol solution of 2,4-diphenyl-4-methyl-1-pentene was added to the reaction mixture in an amount of 60 ppm based on the charged vinyl acetate and then ethylene was purged from the vessel and the mixture was cooled. The obtained copolymerization mixture had a resin content of 45% and the ethylene content in the produced ethylene-vinyl acetate copolymer was 30% by mole.

Unpolymerized vinyl acetate was removed from the reaction mixture by feeding the reaction mixture into the top of a tower filled with Raschig rings and blowing methanol vapor into the lower portion of the tower to contact countercurrently the polymerization mixture with methanol vapor, and a 50% methanol solution of ethylene-vinyl acetate copolymer, which had unpolymerized vinyl acetate content of not more than 0.01%, was obtained.

Then, a hydrolysis reactor was charged with the obtained 50% methanol solution, to which a methanol solution of sodium hydroxide was added in an amount of 100 millimoles of sodium hydroxide based on the vinyl acetate units in the ethylene-vinyl acetate copolymer, and the mixture was heated up to 40° C. and kneaded to deposite, in time, the hydrolysed copolymer in particle form. The hydrolysis reaction was further continued for 3 hours and then the reaction mixture was neutralized with acetic acid. The particiles were separated by a centrifugal separator from reaction mixture. The obtained wet particles were diluted with methanol to give a methanol slurry having a concentration of 10%, which was stirried for 1 hour and then washed. After removing liquid, the obtained particles were again diluted with methanol to give a methanol slurry having a concentration of 10%, to which acetic acid was added in an amount of 1.5 moles per mole of the residual sodium acetate. The obtained slurry was stirred for 2 hours, from which the particles were separated and they were dried. The obtained particles of hydrolysed ethylene-vinyl acetate copolymer had a degree of in vinyl acetate units of 98.0% by mole.

An extruder equipped with a T die (a diameter: 40 mm) was charged with the obtained hydrolysed copolymer and the extrusion was carried out under the following conditions to give a film having a thickness of 30μ.
Cylinder temperature: $C_1=210°$ C., $C_2=230°$ C.
Die temperature: 210° C.
Die available width: 450 mm
Temperature of chill roll: 40° C.
Die lip distance: 0.3 mm
Air gap: 150 mm
Take-off rate: 15 m/minute
Atmosphere temperature: 25° C.

The results are shown in Table 1.

[Effect of inhibiting polymerization (minute)]

This was estimated by the elapsed time at which the resin concentration began to increase in reaction mixture after the inhibitor was added, ethylene was purged and mixture was kept at reaction temperature under stirring.

[Fumes or bad odors during molding]

This was estimated by sensuous judgement.

[Coloration]

A film molded by a T die (thickness: 30μ) was stacked in a thickness of about 1 cm and the stacked films were observed with the naked eye.
Estimation 1: There was no or a little coloration.
2: Films assumed a slight yellow to a slight blown color.
3: Films assumed a light yellow to a light blown color.
4: Films assumed a weak yellow to a weak blown color.
5: Films assumed a yellow to a brown color.

[Fish eye]

This was estimated by the number of fish eyes (diameter: not less than 0.2 mm) observed on area of 100 cm$^2$ of film (thickness: 30μ).

[Haze (%)]

Haze of the film (thickness: 30¾) was measured by a haze meter.

COMPARATIVE EXAMPLES 1 TO 5

The procedure of Example 1 was repeated except that, instead of 2,4-diphenyl-4-methyl-1-pentene, an equimolar amount of a polymerization inhibitor, that is 43 ppm of m-dinitrobenzene (Comparative Example 1), 28 ppm of hydroquinone (Comparative Example 2), 28 ppm of p-benzoquinone (Comparative Example 3), 50 ppm of thiodiphenylamine (Comparative Example 4), 42 ppm of t-butyl catechol (Comparative Example 5) of 26 ppm of styrene (comparative Example 6) was employed. The obtained hydrolysed copolymers had degrees of hydrolysis of 98.0% by mole, 98.5% by mole, 98.2% by mole, 98.7% by mole, 98.3% by mole and 98.1% by mole, in order.

The results are shown in Table 1.

EXAMPLES 2 AND 3

A polymerization vessel was charged with 100 parts of vinyl acetate, 20 parts of methanol and 0.03 parts of 2,2'-azobisisobutyronitrile. After the space in the vessel was displaced with nitrogen gas and then with ethylene, ethylene was introduced to the vessel with pressure till a pressure became 40 Kg/cm$^2$. Then, the mixture was heated up to 60° C. with stirring, and the polymerization reaction was continued for 5 hours. When the polymerization conversion of vinyl acetate was attained to 43%, methanol solution of 1,3-diphenyl-1-butene (Example 2) or 2-phenyl-1-propene (Example 3) was added to the reaction mixture in an amount of 53 ppm or 30 ppm based on the charged vinyl acetate, respctively, and then ethylene was purged from the vessel and the mixture was cooled. The obtained polymerization mixtrue had a resin content of 50% and an ethylene content of the produced ethylene-vinyl acetate copolymer was 35% by mole.

Unpolymerized vinyl acetate monomer was removed from the polymerization mixture in the same manner as in Example 1 to give 50% methanol solution of ethylenevinyl acetate copolymer, which has unpolymerized vinyl acetate content of not more than 0.01%. Then, a hydrolysis reactor was charged with the obtained 50% methanol solution, and a methanol solution of sodium hydroxide was added in an amount of 150 millimoles of sodium hydroxide based on vinyl acetate units in the ethylene-vinyl acetate copolymer. The hydrolysis reaction was carried out at 40° C. for 2 hours to give a slurry of hydrolysed ethylene-vinyl acetate copolymer particles (hereinafter referred to as "the primary product").

After the slurry was neutralized with acetic acid and dried to give a powder of the primary product, the obtained powder was added to water in the hydrolysis reactor and the secondary hydrolysis reaction was carried out at water-slurry system under the following conditions.

Concentration of slurry: 17%
Amount of sodium hydroxide catalyst: 2.5 moles per mole of the residual vinyl acetate units
Reaction temperature: 70° C.
Reaction time: 3 hours After completing the secondary hydrolysis reaction, the reaction mixture was neutralized with acetic acid, from which water was removed. Then, the hydrolysed product was diluted with water in the slurry concentration of 10%, which was stirred for 1 hour and washed. After removing water, the hydrolysed copolymer was again diluted with water in the slurry concentration of 10%, to which phosphoric acid was added in an equimolar amount of the residual sodium acetate. After removing water and drying, a secondary hydrolysed copolymer having a degree of hydrolysis in vinyl acetate units of 99.2% by mole was obtained.

A film having a thickness of 30$\mu$ was prepared in the same manner as in Example 1 by using the thus obtained hydrolysed product.

The results are shown in Table 1.

EXAMPLE 4

A polymerization vessel was charged with 100 parts of vinyl acetate, 27 parts of 1-octene and 20 parts of methanol and heated up to 60° C. After purging gas at 60° C. for 30 minutes, atmosphere of vessel was displaced with nitrogen gas and 1.4 parts of 2,2'-azobisisobutyronitrile was added to the vessel, to which 72 parts of vinyl acetate was uniformly added dropwise for 5 hours.

After completing the addition, the copolymerization reaction was continued for 2 hours. There was 2,4-diphenyl-4-methyl-1-pentene was added to the reaction mixture in an amount of 1000 ppm based on the charged vinyl acetate at the time when the polymerization conversion was 80% and the mixture was cooled. The obtained copolymer had a 1-octene content of 7.2% by mole. The unpolymerized vinyl acetate monomer was removed from the reaction mixture in the same manner as in Example 1.

Then, a hydrolysis reactor was charged with the obtained solution and copolymer concentration was controled with methanol to give 50%.

After sodium hydroxide was added to the methanol solution in an amount of 20 millimols based on vinyl acetate units in the copolymer, the hydrolysis reaction was carried out at 45° C. for 2 hours. Then the reaction mixture was neutralized with acetic acid and separated the deposited particles. The obtained particles was diluted with methanol in slurry concentration of 10% and the methanol slurry was stirred for 1 hour and washed.

After removing methanol, the reaction mixture was again diluted with methanol in slurry concentration of 10%, to which oxalic acid was added in an amount of 0.8 mole per mole of the residual soduim acetate. After stirring for 2 hours, particles were separated from the slurry, which were dried to give a hydrolysed vinyl acetate-1-octene copolymer having a degree of hydrolysis of 99.2% by mole.

A film having a thickness of 30$\mu$ was obtained in the same manner as in Example 1 by employing the thus obtained hydrolysed copolymer The results are shown in Table 1

TABLE 1

|  | Effect of inhibiting Copolymerization (minute) | Fumes or bad odors during molding | Coloration | Fish eye (number) | Haze (%) |
|---|---|---|---|---|---|
| Ex. 1 | Not less than 120 | None | 1 | 2 to 4 | 0.4 |
| Ex. 2 | Not less than 120 | None | 1 | 1 to 4 | 0.4 |
| Ex. 3 | Not less than 120 | None | 1 | 2 to 5 | 0.5 |
| Ex. 4 | Not less than 120 | None | 1 | 1 to 4 | 0.4 |
| Com. Ex. 1 | Not less than 120 | None | 5 | 2 to 4 | 0.4 |
| Com. Ex. 2 | Not more than 10 | None | 3 | 20 to 30 | 1.5 |
| Com. Ex. 3 | Not less than 120 | None | 4 | 2 to 5 | 0.4 |
| Com. Ex. 4 | 110 | A little | 3 | 20 to 30 | 1.4 |

TABLE 1-continued

| | Effect of inhibiting Copolymerization (minute) | Fumes or bad odors during molding | Coloration | Fish eye (number) | Haze (%) |
|---|---|---|---|---|---|
| Com. Ex. 5 | Not more than 10 | None | 4 | 20 to 30 | 1.5 |
| Com. Ex. 6 | 100 | None | 7 | 3 to 5 | 1.2 |

What we claim is:

1. A process for preparing a vinyl alcohol copolymer, which comprises adding at least one olefin derivative containing phenyl group selected from the group consisting of the derivatives of the following formulas (I), (II) and (III) to a solution of a copolymer of vinyl acetate, an olefin selected from the group consisting of ethylene, propylene, isobutylene, α-octene, α-dodecene, and α-octadecene, and up to small amounts of a monomer copolymerizble with the olefin and vinyl acetate; when the predetermined polymerization conversion has been attained, removing unpolymerized monomer; and hydrolyzing the copolymer;

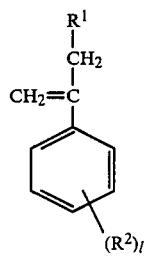

(I)

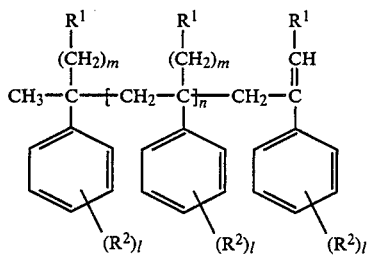

(II)

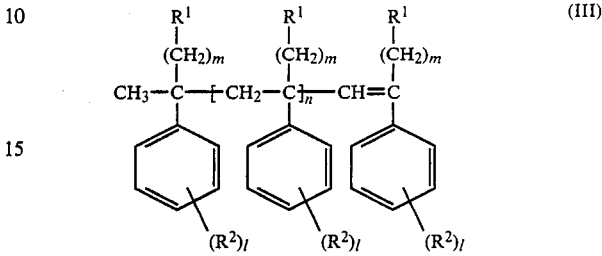

(III)

wherein $R^1$ is hydrogen atom or an alkyl group; $R^2$ is hydrogen atom, an alkyl group, an alkoxyl group, amino group, nitro group, carboxyl group, or an ester group; m is 0 to 1; n is 0 or an integer of 1 to 3; and l is 0 or an integer of 1 to 5; and said monomer copolymerizable with the olefin and vinyl acetate is selected from the group consisting of an olefin; an unsaturated acid, an anhydride, a salt, a monoester or a dialkyl ester thereof; a nitrile; an amide; an olefin sulfonic acid or salt thereof; an alkyl vinyl ether; a vinyl ketone; N-vinylpyrrolidone; vinyl chloride and vinylidene chloride.

2. The process of claim 1, wherein said olefin derivative is 2,4-diphenyl-4-methyl-1-pentene.

3. The process of claim 1, wherein said olefin derivative is 1,3-diphenyl-1-butene.

4. The process of claim 1, wherein said olefin is ethylene.

5. The process of claim 1, wherein the content of said ethylene in the copolymer is from to 10 to 55% by mole.

6. The process of claim 1, wherein the content of ethylene in the copolymer is from 20 to 50% by mole.

7. The process of claim 1, wherein said olefin is ethylene, and said copolymerizable monomer is selected from the group consisting of acrylic acid, methacrylic acid, crotonic acid, maleic acid, itaconic acid, and anhydride, salt or a mono or dialkyl ester of one of said acids, acrylonitrile, methyacrylonitrile, acrylamide, methacrylamide, ethylene sulfonic acid, allylsulfonic acid, a salt thereof, alkyl vinyl ether, vinyl ketone, N-vinylpyrrolidone, vinyl chloride and vinylidene chloride.

8. The process of claim 1, wherein said copolymer is a copolymer of ethylene and vinyl acetate, the content of ethylene in the copolymer being from 10 to 55% by mole.

* * * * *

UNITED STATES PATENT AND TRADEMARK OFFICE
CERTIFICATE OF CORRECTION

PATENT NO. : 4,746,700
DATED : May 24, 1988
INVENTOR(S) : H. TAKIDA

It is certified that error appears in the above-identified patent and that said Letters Patent is hereby corrected as shown below:

```
Title page, left-hand column, after "[73] Assignee:",
"Nippon Fohsei Kagaku Kogyo" Should read --Nippon
 Gohsei Kagaku Kogyo--
```

Signed and Sealed this

Thirteenth Day of December, 1988

Attest:

DONALD J. QUIGG

*Attesting Officer*      *Commissioner of Patents and Trademarks*